April 12, 1938.　　　P. MÜLLER　　　2,114,232
SEARCHLIGHT
Filed Dec. 3, 1935　　　4 Sheets-Sheet 1

Inventor:
Paul Müller
Attorneys:
Bailey & Parson

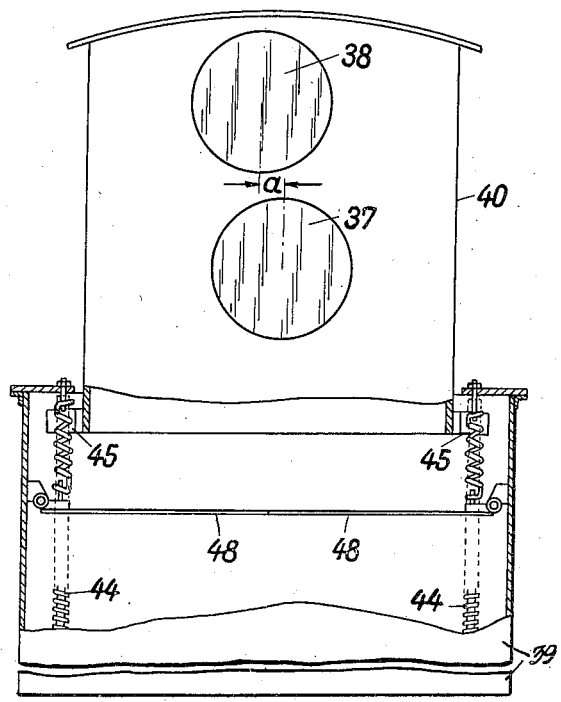
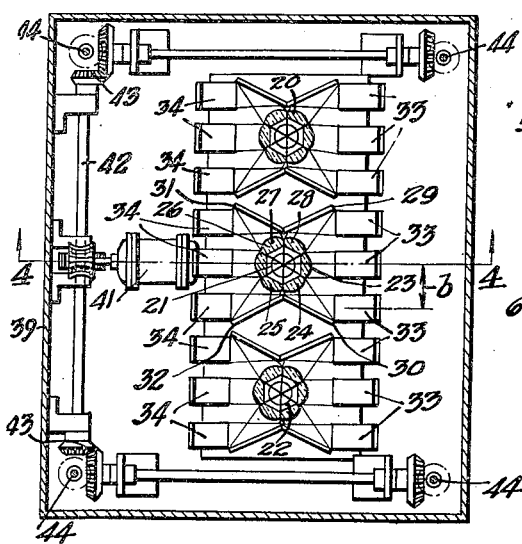
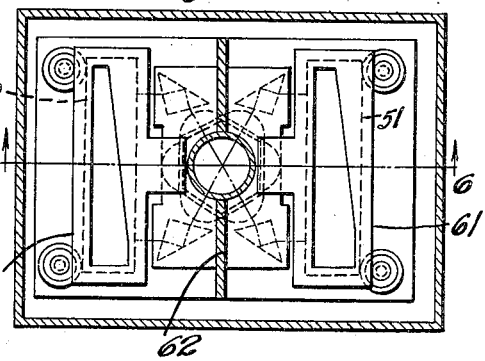

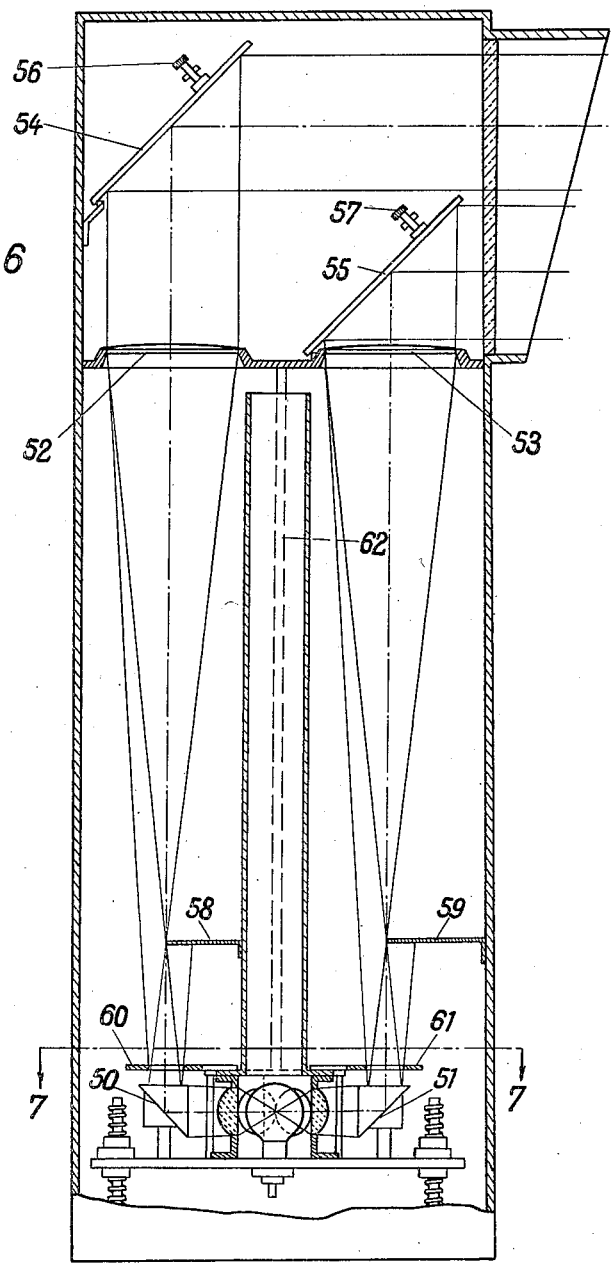

Patented Apr. 12, 1938

2,114,232

UNITED STATES PATENT OFFICE 2,114,232

SEARCHLIGHT

Paul Müller, Berlin-Friedrichshagen, Germany, assignor to Naamlooze Vennootschap Machinerieën-En Apparaten Fabrieken "Meaf" Utrecht Application December 3, 1935, Serial No. 52,718
In Germany October 6, 1934

4 Claims. (Cl. 240—3)

This invention relates to a new searchlight particularly adapted brightly to illuminate surfaces without dazzling an observer positioned near but outside the beam of light.

This freedom from glare is a special feature of the invention and due to the fact that the beam coming from the searchlight is sharply defined and does not as in known searchlights decrease in brightness towards the edge. The searchlight according to the invention is especially suited to serve as headlight for motor vehicles, for illuminating automobile roads or lighting the landing ground of flying fields.

The searchlight according to the invention is equipped with an optical system comprising several lenses or combinations of lenses of short focal length and large aperture with lenses of great focal length and limited aperture, which cooperate so that the smaller short-focus lenses make the illuminant for the long-focus searchlight appear in the form of a narrow luminous strip. Between these two lens systems having different focal lengths a mirror system is inserted, according to the construction chosen, to bring the beam into the desired direction.

If F represents the focal length of the searchlight lens, and $f$ that of the small projection lens, it is known that the luminous intensity of the entire lighting system grows with the increase of the focal length F and the decrease of the focal length $f$.

As the use of a long-focus lens necessarily would mean a construction having a very long length, the mirrors mentioned above are advantageously used to make the system more compact. Furthermore, as the searchlight has to illuminate a landing ground or road from a height of several meters the illuminant is suitably arranged on the bottom of a casing from the upper part of which the light is laterally emitted.

As great luminous intensity is required, this type involves a height that interferes with easy transportation. To render the device portable, particularly for use as flying field light, the casing may consist of parts that can be telescoped. For example, if the device comprises two parts, the part carrying the long-focus searchlight lenses is pushed out of the other part carrying the illuminant with the lens system therefor before starting.

Figure 1:
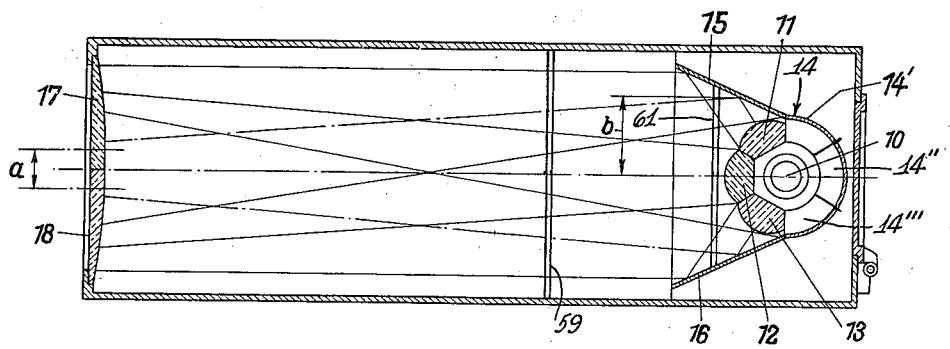
Figure 2:
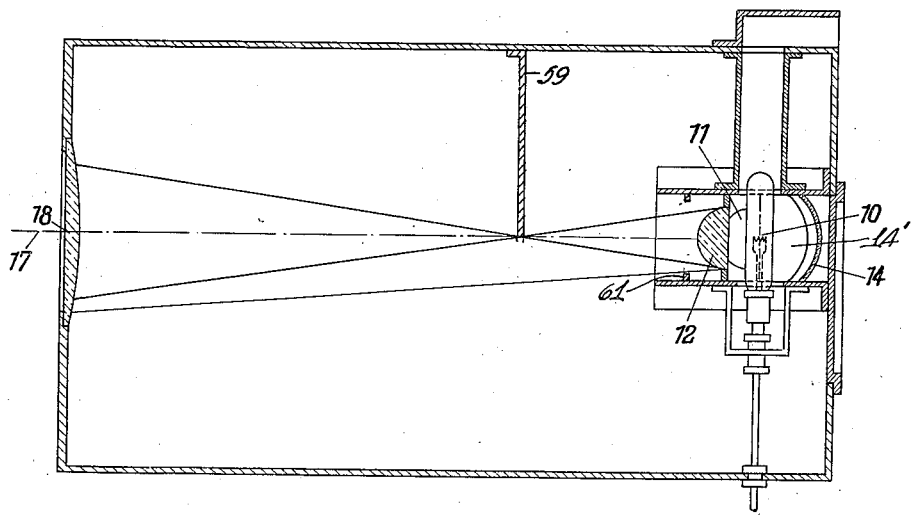
Figure 2A:
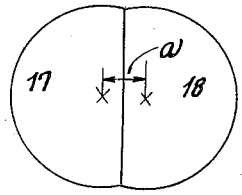

By way of example, the invention is illustrated in the accompanying drawings, in which Figures 1 and 2 diagrammatically show a simple embodiment of the invention; Fig. 2a is a front view of the lenses 17 and 18 shown in Figs. 1 and 2.

Figure 4:
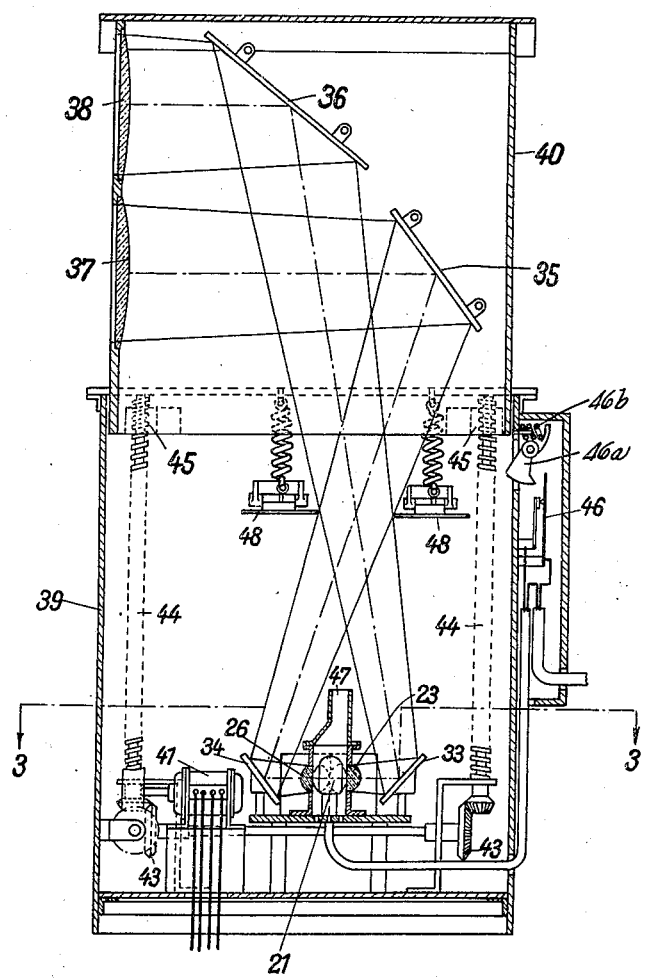

Figs. 3, 4 and 5 show a construction suited particularly for lighting flying fields and adapted to be telescoped, Fig. 3 being a cross section on the line 3—3, of Fig. 4, Fig. 4, a longitudinal section on the line 4—4, of Fig. 3, and Fig. 5, a front view partly in section; Figs. 6 and 7 show a device similar to the one shown in Figs. 3, 4 and 5, but with a changed optical system, Fig. 6 being a longitudinal section on the line 6—6, of Fig. 7, and Fig. 7, a cross section on the line 7—7, of Fig. 6.

Referring to the drawings, in the arrangement according to Fig. 1 the illuminant 10 is semicircularly surrounded by three lenses 11, 12 and 13. It is desirable that these lenses are to have the shortest possible focal length, and for this reason the distance between them and the illuminant is as small as it can safely be made in view of the development of heat and the dimension of the illuminant. In the systems described the focal length amounts for instance to approximately 15 mm. at a lens diameter of, say, 35 mm., so that aperture ratio is 35:15, approximately equal to 1:0.43, and each of these lenses can accommodate a pencil of rays having an apertural angle of approximately 100°.

On the sides where they touch the three lenses are ground so that each of them comprises a pencil of rays of 60° horizontal angular aperture and all of them define a pencil of 180° horizontal and approximately 100° vertical angular aperture. Behind the illuminant 10 a mirror 14 is provided, which reflects the light rearwardly emitted from the illuminant and thus guides it to the lenses 11, 12, 13 as if it were coming from the illuminant.

This mirror 14 preferably consists of two or three spherical mirrors 14', 14", and 14''', adjusted so that the real images of the light source formed by the mirror are positioned closely to the actual illuminant. The pencils emerging from the three lenses 11, 12, 13 diverge at angles of approximately 60°. By means of the mirrors 15, 16 the pencils emerging from the lenses 11 or 13 are deflected in approximately the same direction as the pencil emerging from the lens 12. The searchlight lens of great focal length is composed of two lenses 17, 18, from each of which a segment is cut off, and the cut surfaces are so joined that the distance $a$ of the centers of both lenses equals one-half of the distance $b$ of the axes of the pencils of light emerging from the first-mentioned lenses having a short focus.

The arrangement of the short-focus lenses 11, 12, 13 and of the mirrors 15, 16 brings it about that, seen from the searchlight lenses 17, 18, instead of the actual illuminant 10 three luminous surfaces separated from one another by dark zones appear to be the source of light. If only a single lens were provided in lieu of the lenses 17 and 18, there would be produced on the surface to be illuminated also three bright zones with interposed dark zones. However, by using a searchlight lens consisting of two lenses in the manner described each of the beams or pencils of light coming from a short focus lens strikes each of the long focus lenses, and consequently is broken into two beams one of which emerges from each long focus lens. Therefore the three original beams become six beams, and due to the arrangement of the long focus lenses the three beams from one long focus lens are interposed between the beams from the second long focus lens so that the six beams will form a wide band of substantially constant light intensity upon a surface to be illuminated.

To prevent dazzling diaphragms 59 and 61 are provided between the short and long focal lenses, the diaphragm 59 being out of the focal plane of the lenses and the diaphragms 61 being in the focal plane of the lenses.

The device shown in Figs. 3, 4 and 5 is particularly suited for lighting the landing ground in flying fields on account of its great intensity and because it can be easily transported. The optical system comprises three light sources 20, 21, 22, each surrounded by six lenses, the lenses surrounding the light source 21 being designated 23, 24, 25, 26, 27, 28. Like the lenses 11, 12, 13 in the arrangement according to Figs. 1 and 2, these lenses have the shortest possible focal lengths so as to be capable of comprising a pencil of rays of approximately 100° apertural angle; the six lenses 23, 24, 25, 26, 27, 28 together can define a pencil of 360° horizontal angular aperture. The pencils of rays emerging from the lenses 28 and 24 are deflected by the mirrors 29, 30 in the direction of the pencil coming from the lens 23, and the pencils emerging from the lenses 25 and 27 are deflected by the mirrors 31, 32 in the direction of the pencil emerging from the lens 26. The lenses and mirrors around the light sources 20 and 22 are arranged in the same way. Owing to the arrangement described, two oppositely extending rows of light rays will be produced which are upwardly deflected by two rows of mirrors 33 and 34. In the upper part of the casing two mirrors 35, 36 are positioned which are struck by the pencils of rays coming from the mirror rows 34, 33 and deflected in the desired direction. By means of the lenses 37 and 38, which like the lenses 17, 18 in the arrangement according to Figs. 1 and 2 have a long focus, an image is formed of the two rows of luminous fields produced by the arrangement in the lower part of the searchlight on the surface to be lighted. In order to cause the two pencils of rays composed of light and dark zones to meet in such a way that the light spots of one pencil cover the dark spots of the other pencil, and vice versa, the lenses 37 and 38, as shown in Fig. 5, are staggered so that the horizontal distance $a$ of their centers is equal to one-half of the distance $b$ of two mirrors of the rows 33 or 34.

To render the device easily transportable the casing is made of two parts 39, 40 which can be telescoped.

In the lower part 39 an electromotor 41 is installed for driving a shaft 42 connected by the bevel gears 43 with the screw spindles 44 which are disposed in the part 39 of the casing. In the top portion 40 nuts 45 are provided which embrace the spindles 44 during rotation of which the part 40 will move thereon with the nuts 45. The control members 46 automatically switch on the searchlight when it is in operating position and switch it off when the telescoping of the parts is started. As shown in the drawings the control device may consist of an arm 46a which is projected through the casing 39 by means of a spring 46b. When the casing 40 descends, the lower edge thereof bears against the arm 46a causing it to rotate about its pivot and to strike one of the contact blades of the control members 46 to break the electrical circuit therethrough.

The lower part 39 further contains the light sources 20, 21, 22, the short-focus lenses 23, 24, 25, 26, 27, 28, and the reversing mirrors 33, 34. The lenses are cooled by a ventilating device comprising a chimney arranged above the tubular incandescent lamps, so that by the rising warm air cold air is drawn up to play about the hot parts of the lamp and the lenses. The part 39 further accommodates an automatically unfolding diaphragm member 48, which prevents light from one of the pencils from striking the wrong lens. The upper part 40 carries the searchlight lenses 37, 38 and the reversing mirrors 35, 36.

According to the size and use of the device, any kind of reflecting surfaces, such as metal mirrors, silvered glass mirrors, or totally reflecting prisms, may serve as reflecting mirrors. If glass mirrors are used which are silvered on the rear, relatively thick glass plates must be employed in view of the size of the mirrors. Consequently the different positions of the two mirror images formed by reflection at the front and rear of the glass plates make this disturbingly apparent. In the arrangement according to Figs. 6 and 7 this defect is avoided by having the pencils of rays coming from the reversing mirrors in the lower part of the casing, which are totally reflecting prisms 50, 51, pass first to the searchlight lenses 52, 53 and then only to the mirrors 54, 55. It is not necessary to stagger the lenses relative to one another; it will be sufficient to adjust the mirrors 54, 55 by means of the set screws 56, 57 so that the bright spots of one pencil cover the dark spots of the other pencil, and vice versa.

To prevent dazzling by the brightly illuminated surface it is frequently desirable to provide for the decrease of the brightness of this surface in a certain direction, for instance towards the searchlight. For this purpose, between the prisms 50, 51 and the searchlight lenses 52, 53 the diaphragms 58, 59 may be interposed, which are not located in the focal plane of the searchlight lenses and are therefore not sharply defined, but merely bring about a decrease in brightness on the illuminated area.

Furthermore, particularly in the lighting of automobile roads, it is desirable to limit the pencil of rays emerging from the searchlight so as to prevent vehicles coming from the opposite direction from being dazzled. This can be effected by providing in the focal plane of the searchlight lenses the diaphragms 60, 61 which are then sharply defined on the lighted area. In this way it becomes possible to limit the pencil of rays as required, for instance for adapting it to turns of the road.

To prevent light of a pencil of rays emerging from the prisms 50, 51 from striking a searchlight lens not associated therewith, a partition 62 may be arranged instead of the diaphragms 48 in the arrangement shown in Figs. 4 and 5, provided the two pencils do not intersect.

The device according to Fig. 6, shown with only one light source, may of course be provided with a plurality thereof, and the number of light sources provided in the arrangements according to Figs. 3, 4, 5 may be varied at will.

It is further not necessary to choose three short-focus lenses to be arranged in a semicircle around a light source, or six for the full circle, since the number may be adapted to conditions and vary accordingly.

I claim:—

1. A searchlight comprising a light source, a plurality of short focus lenses for condensing light rays from said source into a plurality of separated beams of light, a plurality of long focus lenses, means to reflect said beams all in substantially the same direction to project each beam through each of a plurality of said long focus lenses whereby each beam separates into a number of beams corresponding to the number of long focus lenses, said long focus lenses being mounted to direct said beams in side by side relation to form a substantially continuous band of even light intensity upon a surface to be illuminated.

2. A searchlight comprising a light source, a plurality of short focus lenses for condensing light rays from said source into a plurality of separated beams of light, reflecting means for directing said beams all in substantially the same direction, a plurality of long focus lenses having their centers spaced half the distance between the centers of said beams at said reflecting means, and each long focus lens intercepting a beam emitted from each short focus lens.

3. A searchlight as in claim 2 comprising three short focus lenses and two long focus lenses whereby three separated beams of light are converted into six beams by said long focus lenses with the spaces between the beams emitted from one long focus lens being filled by the beams emitted from the other long focus lens upon a surface to be illuminated.

4. A lighting system comprising a light source, means producing a plurality of separated light beams all extending in substantially the same direction from said source, and a plurality of condensing lenses, each condensing lens intercepting each of said beams whereby each beam is separated into a number of beams corresponding to the number of long focus lenses and the resulting spaced beams from each lens are directed into the spaces between the beams of the other lens by the mounting of said lenses.

PAUL MÜLLER.